(12) United States Patent
Kinnunen et al.

(10) Patent No.: US 7,466,987 B2
(45) Date of Patent: Dec. 16, 2008

(54) USER INTERFACE FOR A RADIOTELEPHONE

(75) Inventors: Timo Kinnunen, Paavola (FI); Lauri Salomaki, Rovaniemi (FI); Tea Liukkonen-Olmiala, Jaali (FI); Tiina Hynninen, Ould (FI); Jani Pirkola, Kempele (FI); Leena Sippola, Oulu (FI); Risto Lustila, Rovaniemi (FI); Sanna Kaartinen, Oulu (FI)

(73) Assignee: Nokia Mobile Phones Limited, Espoo (FI)

(*) Notice: Subject to any disclaimer, the term of this patent is extended or adjusted under 35 U.S.C. 154(b) by 992 days.

(21) Appl. No.: 09/742,190

(22) Filed: Dec. 22, 2000

(65) Prior Publication Data

US 2001/0021649 A1    Sep. 13, 2001

(30) Foreign Application Priority Data

Dec. 24, 1999    (GB)    .................................. 9930713.4

(51) Int. Cl.
*H04Q 7/20* (2006.01)
*H04M 1/00* (2006.01)
*H04M 1/663* (2006.01)
*H04M 1/64* (2006.01)
*H04B 7/00* (2006.01)
*H04B 1/38* (2006.01)

(52) U.S. Cl. ................. 455/456.3; 455/41.2; 455/412.2; 455/432.1; 455/456.6; 455/466; 455/557; 455/566; 379/88.11; 379/88.12; 379/88.13

(58) Field of Classification Search .............. 455/412.1, 455/412.2, 413, 414.4, 422.1, 426.1, 426.2, 455/432.2, 439, 440, 445, 456.1, 466, 432.1, 455/512.2, 456.6, 557, 566; 709/206, 207, 709/219; 370/428; 379/214.01, 88.11–88.13; G06F 17/30
See application file for complete search history.

(56) References Cited

U.S. PATENT DOCUMENTS

| | | | |
|---|---|---|---|
| 5,493,692 A | | 2/1996 | Theimer et al. |
| 5,740,541 A | * | 4/1998 | Flippo et al. ................. 455/502 |
| 5,781,186 A | * | 7/1998 | Jennings ................... 715/500.1 |
| 5,838,685 A | * | 11/1998 | Hochman ................... 370/428 |
| 6,108,688 A | * | 8/2000 | Nielsen ....................... 709/206 |
| 6,119,014 A | * | 9/2000 | Alperovich et al. ........... 455/466 |
| 6,175,743 B1 | * | 1/2001 | Alperovich et al. ......... 455/466 |
| 6,177,905 B1 | * | 1/2001 | Welch ................... 342/357.13 |
| 6,185,433 B1 | * | 2/2001 | Lele et al. .................... 455/528 |

(Continued)

FOREIGN PATENT DOCUMENTS

EP    0 788 065 A2    8/1997

(Continued)

*Primary Examiner*—Fan Tsang
*Assistant Examiner*—Lisa Hashem
(74) *Attorney, Agent, or Firm*—Alston & Bird LLP

(57) ABSTRACT

A user interface for a radiotelephone 1 is described in which the user is able to select components from a variety of sources including multimedia sources and the Internet. The user is then able to combine the components in a message and furthermore edit them to add expression to the message and to set delivery conditions for the message. The message may be archived for later use or immediately sent to a third party either separately or as an attachment to another file.

25 Claims, 2 Drawing Sheets

U.S. PATENT DOCUMENTS

| | | | |
|---|---|---|---|
| 6,219,694 B1 * | 4/2001 | Lazaridis et al. | 709/206 |
| 6,263,201 B1 * | 7/2001 | Hashimoto et al. | 455/403 |
| 6,351,647 B1 * | 2/2002 | Gustafsson | 455/466 |
| 6,351,763 B1 * | 2/2002 | Kawanaka | 709/206 |
| 6,360,101 B1 * | 3/2002 | Irvin | 455/456.6 |
| 6,377,793 B1 * | 4/2002 | Jenkins | 455/412.1 |
| 6,385,305 B1 * | 5/2002 | Gerszberg et al. | 379/88.13 |
| 6,421,707 B1 * | 7/2002 | Miller et al. | 709/206 |
| 6,463,464 B1 * | 10/2002 | Lazaridis et al. | 709/207 |
| 6,480,711 B1 * | 11/2002 | Guedalia | 455/412.1 |
| 6,486,794 B1 * | 11/2002 | Calistro et al. | 340/825.49 |
| 6,529,737 B1 * | 3/2003 | Skinner et al. | 455/466 |
| 6,636,733 B1 * | 10/2003 | Helferich | 455/412.2 |
| 6,678,515 B1 * | 1/2004 | Gillespie et al. | 455/412.1 |
| 6,680,675 B1 * | 1/2004 | Suzuki | 340/988 |
| 6,732,273 B1 * | 5/2004 | Byers | 713/193 |
| 6,751,473 B1 * | 6/2004 | Goyal et al. | 455/556.1 |
| 6,757,713 B1 * | 6/2004 | Ogilvie et al. | 709/206 |
| 6,826,407 B1 * | 11/2004 | Helferich | 455/466 |
| 6,865,191 B1 * | 3/2005 | Bengtsson et al. | 370/475 |
| 6,898,445 B2 * | 5/2005 | Slettengren et al. | 455/567 |
| 6,954,657 B2 * | 10/2005 | Bork et al. | 455/567 |
| 6,970,535 B2 * | 11/2005 | Gregory et al. | 379/88.13 |
| 6,980,798 B2 * | 12/2005 | Kido | 455/412.1 |
| 7,010,288 B2 * | 3/2006 | Brown et al. | 455/412.1 |
| 7,076,241 B1 * | 7/2006 | Zondervan | 455/412.1 |
| 7,123,902 B2 * | 10/2006 | Matsuda | 455/412.1 |
| 7,142,895 B2 * | 11/2006 | Heatley | 455/574 |
| 2001/0050977 A1 * | 12/2001 | Gerszber et al. | 379/88.13 |
| 2003/0003901 A1 * | 1/2003 | Kuroiwa | 455/419 |
| 2004/0014459 A1 * | 1/2004 | Shanahan | 455/414.1 |
| 2004/0090951 A1 * | 5/2004 | Jung | 370/352 |
| 2004/0153513 A1 * | 8/2004 | Laumen et al. | 709/206 |
| 2004/0181340 A1 * | 9/2004 | Smith | 702/3 |
| 2004/0198395 A1 * | 10/2004 | Kimoto et al. | 455/456.1 |
| 2004/0203608 A1 * | 10/2004 | Osann, Jr. | 455/412.1 |
| 2004/0210845 A1 * | 10/2004 | Paul et al. | 715/731 |
| 2005/0097176 A1 * | 5/2005 | Schatz et al. | 709/206 |
| 2006/0128398 A1 * | 6/2006 | Chin et al. | 455/456.3 |
| 2006/0256812 A1 * | 11/2006 | Qu et al. | 370/466 |

FOREIGN PATENT DOCUMENTS

| | | | |
|---|---|---|---|
| EP | 788065 A2 * | 8/1997 | |
| EP | 0 813 161 | 12/1997 | 709/206 |
| WO | WO 99/37105 | 7/1999 | |
| WO | WO 99/51048 | 10/1999 | |
| WO | 99/57927 | 11/1999 | 455/466 |

* cited by examiner

USER INTERFACE FOR A RADIOTELEPHONE

BACKGROUND OF THE INVENTION

1. Field of the Invention

The present invention relates to a messaging interface for a communication device, particularly although not exclusively a radiotelephone handset.

2. Description of the Prior Art

The range of communication options available to users of radiotelephone handsets is continually expanding. At present, in addition to conventional voice communication, it is possible to send text messages and electronic mail (email). One example of a text messaging service is the short message service (SMS) available under the OSM system. Additional communication methods, which are being implemented presently or in the near future, will allow multimedia images and audio to be transmitted between handsets. Such information may be stored within the memory of a handset but is more likely to be held remotely of the telephone, perhaps in a server connected to the Internet.

The users of existing non-voice communication options are presently constrained to a either a rather functional interface having extremely limited delivery options or, where the handset is capable of interacting with the internet, a much more complex interface that can be bewildering to an inexperienced or a computer illiterate individual. Furthermore, the manner in which a short text message or email is displayed on the handset of a message recipient remains outside of the control of the sender. This limitation is not acceptable when considering the possibilities offered by multimedia sources now available.

Thus, the present invention is intended to provide an improved user interface which is not only intuitive to operate, but also provides the capability necessary to allow the user to express himself or herself to a full extent when compiling a message particularly a message involving a range of multimedia sources.

SUMMARY OF THE INVENTION

According to one aspect of the invention, there is provided a communications device including a messaging user interface, the interface including means for selecting a component for inclusion in a message, means for selecting the conditions under which the message may be opened and means for storing said component as a message together with a message header holding the message delivery conditions in a memory of the communication device.

Preferably, the message header will contain data relating to a range of user defined conditions relating to the delivery of the message. The message header could be stored separately of or alternatively as part of the message. The data contained in the header could include the time, date, and even location of the message recipient's device. Where the recipient's device is equipped with the necessary interface, the user, that is to say the sender of the message, could pre-set a similar equipped device on which the message will be opened for example, a hi-fi for an audio component or a television monitor for a video component. In which case, the message may also usefully contain presentation information relating to a component of the message. This information might include parameters relating to the size, playback speed and positioning of a video image, for example.

According to a further aspect of the invention, there is provided a method of creating a message on a communications device, comprising selecting a component from a source and defining a set of conditions for delivery of the message.

According to a yet further aspect of the invention, there is provided a method of opening a message created in accordance with the above method, the method comprising receiving the message, storing the message in the communication device, analyzing the delivery conditions and in the event that they are met opening the message.

In order to aid in understanding the invention, a specific embodiment thereof will now be described by way of example and with reference to the accompanying drawings, in which:

DETAILED DESCRIPTION OF THE INVENTION

Figure 1:
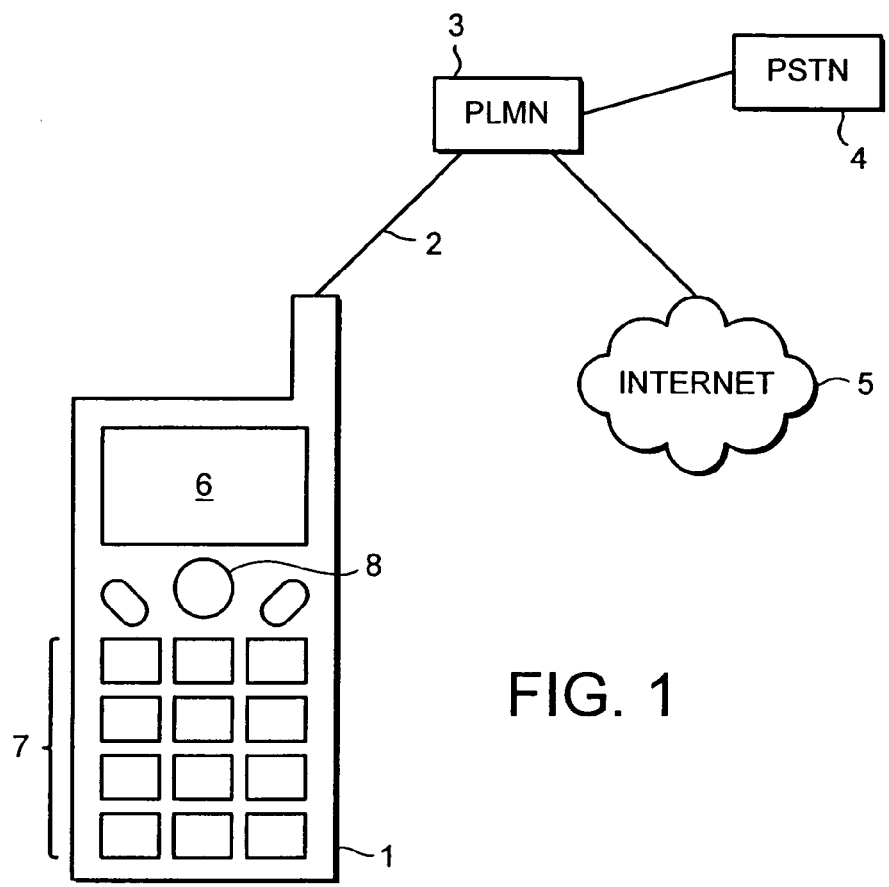
FIG. 1 is a diagrammatic view of a communication network incorporating a communications device having a user interface in accordance with the invention.

Referring to the FIG. 1, there is shown a communications device such as a 25 cellular radiotelephone 1 having a link 2 via a public land mobile network (PLMN) 3, to a public switched telephone network (PSTN) 4 and the Internet. The device 1 is provided with an LCD screen or display 6 made up of a plurality of lines. The display 6 is of sufficient resolution to permit text messages and images to be displayed thereon. The radiotelephone 1 further includes a memory and a processor. In addition to providing the usual functions of a mobile station within a PLMN 3, details of which are well known in the art, the memory and processor provide a set of tools with which messaging information, which may be as simple as a textual message or as complex as multimedia information, may be manipulated by a user and sent to a recipient for subsequent display.

The basic function of the display 6 is to provide a user with information concerning the status of the radiotelephone 1 and the PLMN 3 of which it forms an element. As is conventional, the user operates the radiotelephone by depressing one or more keys on a keypad 7 in a certain sequence. However, in a non-illustrated variant, the keys are replaced by a so-called touch sensitive screen that permits a user to press lightly on an image generated on the screen that corresponds to a function of the telephone 1. In either case, the user input via the keypad 7 is interpreted by the processor and a corresponding function is carried out.

The radiotelephone 1 is provided with an advanced user interface based on a set of menus having a pre-defined hierarchical structure each of which can be selected by the user of the radiotelephone 1. Each menu contains a list of one or more options, which the user may browse using scroll key 8 and from which specific functions are selectable. The user interface permits the user to request the performance of certain functions by the radiotelephone 1 which include, but are not limited to, accessing sources, including multimedia sources, from various locations within the a communications network comprising the PLMN 3, PSTN 4 and the Internet 5, in addition to the memory resource of the radiotelephone itself.

Figure 2:
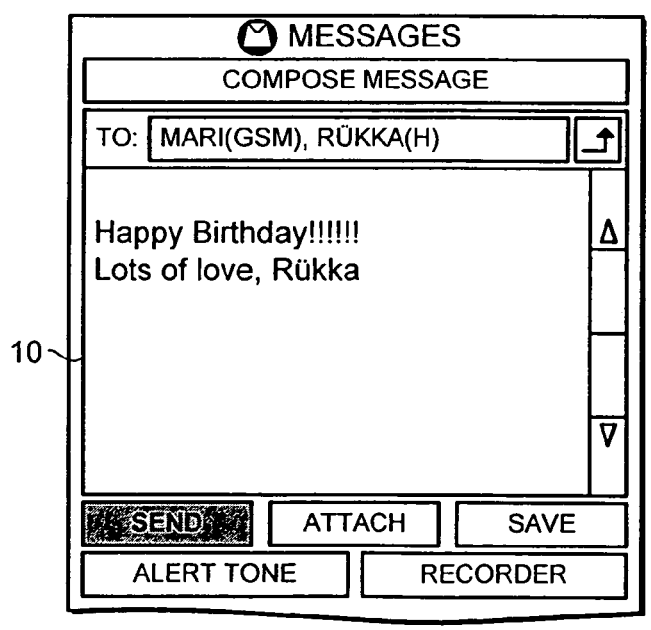
FIG. 2 is a view of a menu screen of the user interface of FIG. 1.

FIG. 2 shows an example of a screen 10 which, when shown on the display 6, presents the user with a number of options relating to the creation of, in this example, a multimedia file. Thus, by previously having carrying out a sequence of key presses, the user, who for convenience is referred to as a sender, will have selected this menu from the hierarchical structure and is then able to browse the desired options from the set available on that menu. The interface allows a user both to enter information in the form of text and also to compile information gathered from a number of locations, both within and without the radiotelephone 1, to produce a multimedia file. Thus, in use, the sender may firstly access a sound file held internally of the telephone 1 or perhaps externally on the Internet 5. The sound file is stored in the multimedia file. In the case of an Internet source file, the multimedia file may hold simply the URL address of the sound file. Similarly, the user may select a video image file from the Internet and store the URL address of that file in the multimedia file. Further components of the multimedia message file may be assembled either from internal telephone 1 resources such as a set of pre-stored images or external resources such as the Internet 5.

Once complied or indeed during the compilation of the multimedia message, the user is given access through the interface to a set of tools which permit the sender to modify, if required, the presentation of the compiled information to a recipient. Thus, the sender is able to modify, for example, the volume of sounds, the speed of playback of video clips, and the position and sizes of images of a video file as they would appear on a display of a recipient's communications device. These parameters are stored in the multimedia message and associated with the component to which they relate. The multimedia message may then be archived, either sent as an enclosure to a separate message or, indeed, sent as message itself.

As a prerequisite to either sending the multimedia message as an attachment or separately, the sender is given the opportunity to select the recipient of the multimedia message either by directly entering a telephone number or by selecting an entry in a contact list maintained in the memory of the radiotelephone and accessed via the interface. The sender is further given the opportunity to set the conditions under which the multimedia message can be read by a recipient. Thus, the sender may specify the time, date and even location at which the message may be read. In addition, the sender may predetermine how much of the message may be available to the receiver depending on the capabilities of the receiver's communication device. With respect to the conditions of time and date, these could allow the creation of a birthday greeting message, which would be opened only on the receiver's birthday.

A message could also be created which opened when the receiver's device reached a specific location. A location could be defined either in terms of a geographical position or perhaps by proximity to a particular type of device. In the former case, the sender could enter the specific location via a map retrieved from the network or held within the memory of his device. The sender could then select a location from the map or alternatively directly enter co-ordinates. This location information could then be translated into a specific cell site, entry into that would cause the multimedia message to open. Alternatively, where the recipient's communication device has access to a GPS receiver, a comparison of the co-ordinates included with the multimedia message could be made with those derived from the GPS receiver and the message opened at the appropriate location. In the second case, the recipient's device will be provided with a wireless network interface such as Bluetooth low power radio frequency network interface such that it could detect the presence, via a local network or piconet, of another similarly equipped device which meets the criteria set by the sender for opening the message. For example, the sender could specify a wireless network interface equipped television monitor for display of a the message. On entering a room containing such a monitor, the receiver's device would detect the presence of the monitor and negotiate the display of the message with the monitor over the wireless network.

Figure 3:
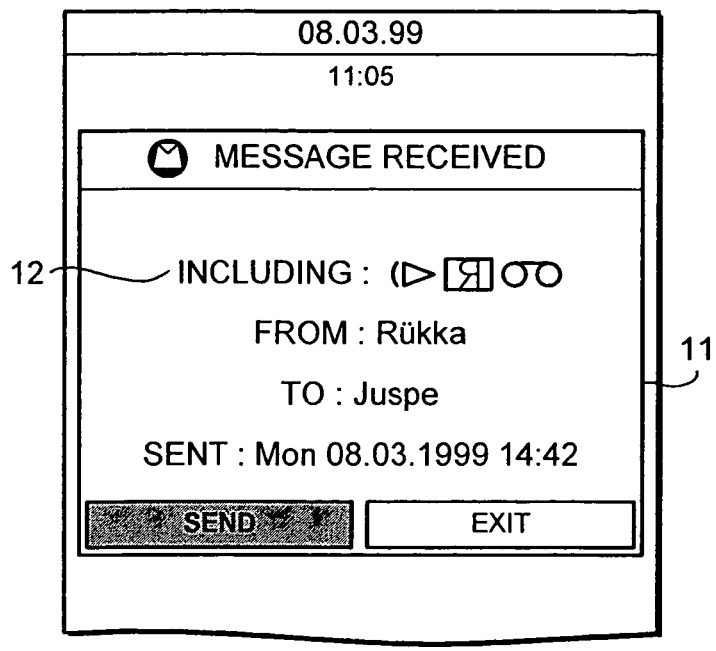
FIG. 3 is a view of a screen of a recipient of a multimedia message created by the user interface of FIG. 1.
Figure 4:
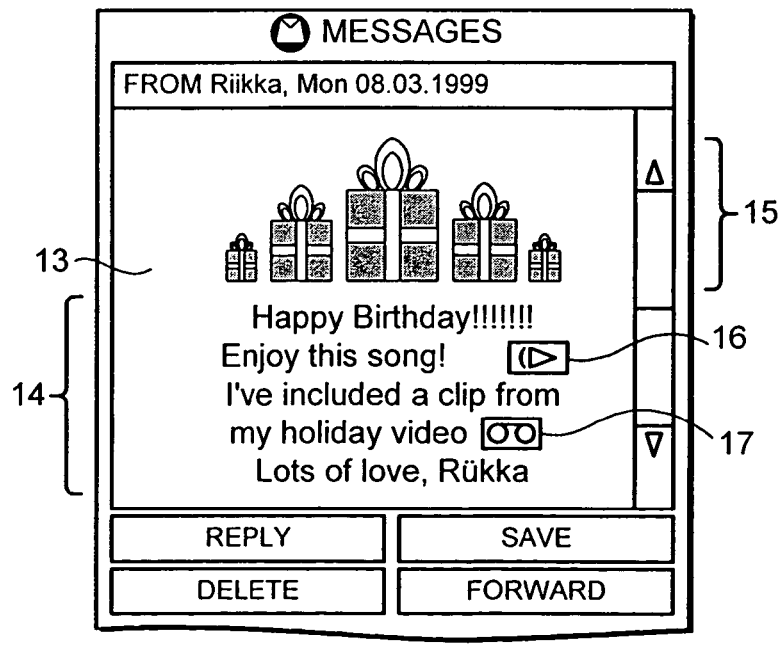
FIG. 4 is a view of a further screen of the recipient of the message created by user interface of FIG. 1.

Referring now to FIGS. 3 and 4, these are illustrative of the screen displays presented to the receiver of a message compiled in accordance with the foregoing description. The receiver is initially presented with a message header screen 11 (FIG. 3) setting out details 12 of the message including warnings of any content which may alarm or otherwise disturb the recipient such as the presence of loud sounds and the like. The message header might also list the requirements for reading the file. For example, the file may contain a video clip that may be displayed on a television. In which case both the television and the recipient's handset would require the necessary connectivity to facilitate the display of the clip. The header may also indicate whether the contents of the multimedia file are embargoed and until what date. FIG. 4 shows a screen display 13 of the multimedia file corresponding to the header screen 11 once it has been opened by the recipient. It should be noted that in addition to text 14 and visual 15 components, there are links, represented by icons 16,17, to a video clip and an audio recording, respectively.

What is claimed is:

1. A messaging user interface of a communication device of a message sender, the interface being configured for:
   selecting a component for inclusion in a message,
   selecting location conditions under which the message is enabled to be opened by a device of a recipient, the location conditions defining a location of the device of the recipient of the message, wherein the recipient and the message sender are different entities, and
   storing said component as a portion of the message together with a message header holding the location conditions under which the message is enabled to be opened by the device of the recipient in a memory of the communication device, the message header further including information descriptive of content of the message and information displayable to the recipient indicating requirements to read the message.

2. A user interface as claimed in claim 1, wherein the message includes a plurality of components and associated presentation files.

3. A user interface as claimed in claim 1, in which at least one component is a multimedia file.

4. A user interface as claimed claim 1, wherein the device is configured for creating a presentation file associated with said component, said file being stored with said message.

5. A user interface as claimed in claim 4, wherein the presentation file contains parameters relating to size and position of a component comprising a video image.

6. A user interface as claimed in claim 4, wherein the presentation file contains parameters relating to a volume of a component comprising an audio recording.

7. A user interface as claimed in claim 4, wherein the presentation file contains parameters relating to a color and a font of a component comprising a text string.

8. A user interface as claimed in claim 1, wherein the user interface is configured for formatting the message as an attachment to a short text message.

9. A user interface as claimed in claim 1, wherein the user interface is configured for formatting the message as an email.

10. A user interface as claimed in claim 1, including a wireless network interface.

11. A user interface as claimed in claim 1, wherein the device is a radio telephone.

12. A user interface as claimed in claim 1, wherein the message includes a presentation file associated with the component, and wherein the user interface enables the sender to generate a file corresponding to the presentation file and including parameters relating to control, at the device of the recipient, of a speed of playback of a video file comprising the presentation file.

13. A user interface as claimed in claim 1, wherein the user interface is further configured to enable the sender to predetermine how much of the message is available to the recipient based on the capabilities of the device of the recipient.

14. A method comprising:
   selecting a component for inclusion in a message at a communication device;
   selecting, at a device of a message sender, location conditions under which the message is enabled to be opened by a device of a recipient, the location conditions defining a location of the device of the recipient of the message, wherein the recipient and the message sender are different entities; and
   storing said component as a portion of the message together with a message header holding the location conditions under which the message is enabled to be opened by the device of the recipient in a memory of the communication device, the message header further including information descriptive of content of the message and information displayable to the recipient indicating requirements to read the message.

15. The method of claim 14, further comprising creating a presentation file associated with said component, and storing said presentation file with said message.

16. The method of claim 15, wherein creating the presentation file comprises creating a file including parameters relating to size and position of a component comprising a video image.

17. The method of claim 15, wherein creating the presentation file comprises creating a file including parameters relating to a volume of a component comprising an audio recording.

18. The method of claim 15, wherein creating the presentation file comprises creating a file including parameters relating to a color and a font of a component comprising a text string.

19. The method of claim 14, further comprising formatting the message as an attachment to a short text message.

20. The method of claim 14, further comprising formatting the message as an email.

21. The method of claim 14, further comprising creating a presentation file associated with the component, and storing the presentation file with the message, wherein creating the presentation file comprises creating a file including parameters relating to control of a speed of playback of a video file comprising the presentation file at the device of the recipient.

22. The method of claim 14, further comprising enabling the sender to predetermine how much of the message is available to the recipient based on the capabilities of the device of the recipient.

23. An apparatus comprising a processor configured to:
   select a component for inclusion in a message,
   select location conditions under which the message is enabled to be opened by a device of a recipient, the location conditions defining a location of the device of the recipient of the message, wherein the recipient and message sender are different entities, and
   store said component as a portion of the message together with a message header holding the location conditions under which the message is enabled to be opened by the device of the recipient in a memory of the apparatus, the message header further including information descriptive of content of the message,
   wherein the apparatus is configured to create a presentation file associated with said component, said presentation file being stored with said message, and
   wherein the presentation file includes parameters relating to control of a speed of playback of a video file comprising the presentation file at the device of the recipient.

24. The apparatus of claim 23, wherein the message header further includes information displayable to the recipient indicating requirements to read the message.

25. The apparatus of claim 23, wherein the processor is further configured to enable the sender to predetermine how much of the message is available to the recipient based on the capabilities of the device of the recipient.

* * * * *